United States Patent
Legerton

(10) Patent No.: US 10,073,283 B2
(45) Date of Patent: Sep. 11, 2018

(54) OPHTHALMIC EYEWEAR FOR VIEWING ELECTRONIC DISPLAYS

(71) Applicant: GLOBAL OPHTHALMIC CONSULTANTS, LLC, Jupiter, FL (US)

(72) Inventor: Jerome A. Legerton, Jupiter, FL (US)

(73) Assignee: GLOBAL OPHTHALMIC CONSULTANTS, LLC, Jupiter, FL (US)

( * ) Notice: Subject to any disclaimer, the term of this patent is extended or adjusted under 35 U.S.C. 154(b) by 147 days.

(21) Appl. No.: 14/207,198

(22) Filed: Mar. 12, 2014

(65) Prior Publication Data

US 2014/0268025 A1 Sep. 18, 2014

Related U.S. Application Data

(60) Provisional application No. 61/786,147, filed on Mar. 14, 2013.

(51) Int. Cl.
 *G02C 7/10* (2006.01)

(52) U.S. Cl.
 CPC ............... *G02C 7/104* (2013.01); *G02C 7/10* (2013.01); *G02C 7/102* (2013.01)

(58) Field of Classification Search
 CPC .......... G02C 7/10; G02C 7/104; G02C 7/105; G02C 7/086; G02C 7/088; G02C 7/108
 USPC .............................................. 351/44, 45, 47
 See application file for complete search history.

(56) References Cited

U.S. PATENT DOCUMENTS

| | | | | |
|---|---|---|---|---|
| 3,111,675 | A * | 11/1963 | Mora ..................... | G02C 7/105 2/12 |
| 4,247,177 | A * | 1/1981 | Marks ................ | H04N 13/0217 348/E13.007 |
| 4,826,286 | A * | 5/1989 | Thornton, Jr. ......... | G02C 7/104 359/588 |
| 5,187,207 | A * | 2/1993 | Gallas ..................... | A62D 7/00 252/582 |
| 5,846,457 | A * | 12/1998 | Hoffman .......... | B29D 11/00317 264/2.1 |
| 5,922,246 | A * | 7/1999 | Matsushita ............ | G02B 1/041 252/582 |
| 5,971,537 | A * | 10/1999 | Fukuma ............. | G01M 11/0207 351/44 |
| 6,305,801 | B1 * | 10/2001 | Kerns, Jr. ................ | G02C 7/04 351/159.02 |
| 2005/0043793 | A1 * | 2/2005 | Pratt ......................... | A61F 2/16 623/6.6 |
| 2006/0146275 | A1 * | 7/2006 | Mertz .................... | G02C 7/104 351/44 |

(Continued)

*Primary Examiner* — Jordan Schwartz
(74) *Attorney, Agent, or Firm* — Sheppard Mullin Richter & Hampton LLP

(57) ABSTRACT

Ophthalmic eyewear is provided, comprising a frame and a spectacle lens having a filter and being disposed within the frame. The filter comprises a spectral characteristic that transmits red, green and blue light as mixed and emitted by an electronic display, while blocking substantially all broadband light other than the same bandwidths. Further ophthalmic eyewear is provided comprising a contact lens having a filter, wherein the filter comprises a spectral characteristic that transmits red, green and blue light as mixed and emitted by an electronic display, while blocking substantially all broadband light other than the same bandwidths.

2 Claims, 1 Drawing Sheet

(56) References Cited

U.S. PATENT DOCUMENTS

| | | | | |
|---|---|---|---|---|
| 2012/0008217 A1* | 1/2012 | Ishak | ............... | A61F 2/1613 |
| | | | | 359/722 |
| 2013/0141693 A1* | 6/2013 | McCabe | ............ | G02C 7/104 |
| | | | | 351/159.56 |
| 2014/0093661 A1* | 4/2014 | Trajkovska | ............ | G02C 7/10 |
| | | | | 427/600 |
| 2014/0233105 A1* | 8/2014 | Schmeder | ............ | G01J 3/465 |
| | | | | 359/590 |
| 2014/0300617 A1* | 10/2014 | Cameron | ............ | G09G 5/02 |
| | | | | 345/589 |

\* cited by examiner

OPHTHALMIC EYEWEAR FOR VIEWING ELECTRONIC DISPLAYS

REFERENCE TO RELATED APPLICATIONS

This application claims priority to U.S. Provisional Patent Application No. 61/786,147, filed Mar. 14, 2013, the content of which is incorporated herein by reference in its entirety.

FIELD OF THE INVENTION

The present invention relates generally ophthalmic eyewear. More particularly, the present invention relates to ophthalmic eyewear for viewing electronic displays.

BACKGROUND OF THE INVENTION

Conventional spectacle eyewear has been produced by the process of first manufacturing frames or frame components followed by cutting and edging lenses to fit the frame, or to be mounted together by a bridge and including end-pieces to which temples or earpieces are attached. The spectacle lenses can be produced in an uncut form by way of casting or molding a semi-finished blank with one surface complete and surfacing the opposing surface to create a finished prescription, or by casting or molding a lens wherein both surfaces are finished.

Computer Vision Syndrome (CVS) is a complex of eye and vision problems following the use of electronic displays including remote terminals, laptop computers, pads, electronic books, game consoles and mobile phones. There are a number of causative factors suggested including dry eyes, oculomotor stress and fatigue, eyelid muscle stress and fatigue, and ciliary muscle over action.

All non-display light directed toward the eye and reflecting on the display has the potential of damaging the contrast ratio and quality of the display image. This visual noise, glare and interfering light has the potential of causing the viewer to experience discomfort and strain while also becoming a stimulus for narrowing the lid aperture and increasing the tonicity of the muscles of the eyelids.

U.S. Pat. Nos. 7,976,157 and 8,342,681 to Croft et al. disclose and claim stock computer eyewear comprising: first and second lens portions for viewing a screen; and a frame portion to support the first and second lens portions, wherein the first and second lens portions are configured to selectively attenuate the transmission of a spectral peak in the emission of fluorescent lighting through the first and second lens portions. These patents further disclose computer eyewear comprising: first and second powered lens portions with substantially equal optical power to provide non-prescription correction for viewing a computer screen; and a frame portion disposed about said first and second lens portions to provide support, wherein said first and second lens portions include an optical filter whose transmission curve in the visible spectrum has a feature that coincides with at least one spectral peak in the emission of fluorescent lighting, the feature being located at about 440 nm and having a width of about 25 nm, wherein the effect of said feature is to selectively attenuate the transmission of said at least one spectral peak through said optical filter.

The Croft patents are directed toward providing a tint or filter that blocks a portion of the visible blue light found in fluorescent lighting. Disadvantageously, this wavelength approximates one of the wavelengths required to produce the full spectrum of colors in a computer display. The Croft patents are limited to ready-made or stock eyewear having the claimed filter with the use of a low plus power, what appears to be a horizontal prismatic addition, and a frame which has a relationship with the average facial bone structure to provide a proximity to the face which is intended to create a higher humidity behind the eyewear than in the ambient environment of the user.

SUMMARY OF THE INVENTION

Embodiments of the present invention are directed toward the treatment of Computer Vision Syndrome (CVS). In particular, some embodiments are directed toward correcting the problem of light interference when viewing displays which have visual content generated from the standard red, green and blue wavelengths in the presence of ambient light which interferes with the display content directly and by reflection on the display face.

Further embodiments of the invention address the need to reduce the ambient direct and reflected light while passing all pixel generated light of a display. The problems caused by non-display light are greatest when attempting to view an electronic display in outdoor light which severely compromises the ability to see electronic displays.

One shortcoming of the above-noted Croft patents is the failure to attenuate direct ambient light and reflected light which damages the retinal image. Another shortcoming is the failure to improve the contrast ratio when viewing the display and the failure to improve the color separation of lower quality displays. The Croft patents also fail to improve the ability to see electronic displays in high ambient illumination as found during daytime outdoor conditions.

Embodiments of the invention address various problems to improve visual performance and to improve the comfort and ease of viewing displays. These problems include, but are not limited to: (i) the brightness of broadband light in the environment which is directed toward the eye (ambient broadband light prevents the ability to use electronic displays during daytime outdoor conditions); (ii) the broadband light reflected by the electronic display surface; (iii) the poor color separation of lower quality displays which reduces their color quality and creates the appearance of lower contrast and resolution; (iv) the blue light hazard from the blue light component of the white backlight and the blue light component of the pixels; and (v) that more than fifty percent of computer users require prescriptions for correcting refractive errors and presbyopia (such users also have phorias and binocular vision correction requirements).

Although the prior art provides for some reduction of the blue light hazard in a non-specific way, it fails to reduce broadband direct and reflected light. In addition, the prior art does not improve color separation or enhance contrast. The prior art is limited in the ability to provide individual correction of refractive errors, compensation for presbyopia, or proper prismatic correction for near phorias and reduced ductions.

Various embodiments of the present invention are directed to ophthalmic eyewear comprising a frame and a spectacle lens having a filter and being disposed within the frame. The filter comprises a spectral characteristic that transmits red, green and blue light as mixed and emitted by an electronic display, while blocking substantially all broadband light other than the same bandwidths.

Another embodiment provides ophthalmic eyewear comprising a contact lens having a filter, wherein the filter comprises a spectral characteristic that transmits red, green and blue light as mixed and emitted by an electronic display, while blocking substantially all broadband light other than the same bandwidths.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Various embodiments of the invention are directed to spectacle lens ophthalmic eyewear including ophthalmic lenses and contact lenses. An ophthalmic lens can be a spectacle lens or a lens mounted in ophthalmic eyewear. The ophthalmic eyewear may include a right lens and a left lens. The eyewear may be designed to sit in the spectacle plane or in another plane as in a goggle or other head mounted format. A contact lens may comprise any lens configured to be positioned in direct contact with an wearer's eye. The contact lens can be a soft lens, rigid lens, hybrid lens, intracorneal lens, corneal onlay, or intraocular lens.

Figure 1:
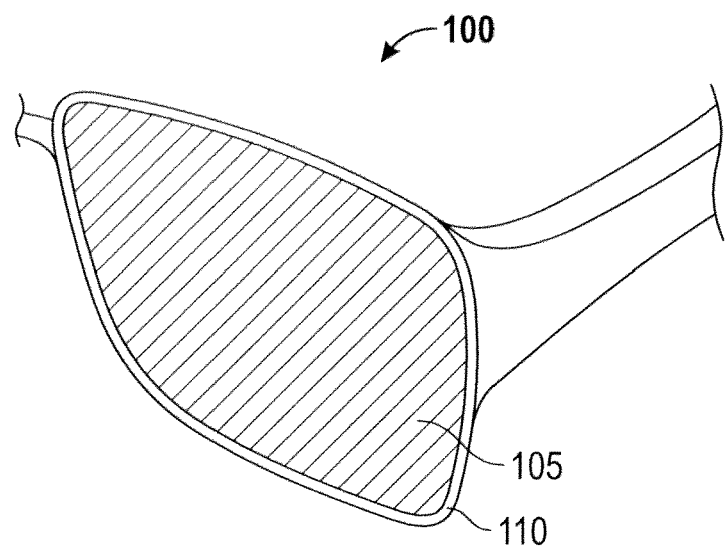
FIG. 1 is a perspective view illustrating spectacle lens ophthalmic eyewear comprising a spectacle lens having a filter and being disposed within a frame according to an embodiments of the invention.

FIG. 1 illustrates spectacle lens ophthalmic eyewear 100 comprising a spectacle lens 105 having a filter and being disposed within a frame 110. The filter can comprise a three band band-pass filter having a spectral characteristic that transmits the red, green and blue light as mixed and emitted by an electronic display, while blocking substantially all broadband light other than the same bandwidths. Other types of filters, such as those discussed hereinbelow, may be employed without departing from the scope of this embodiment. In the illustrated embodiment, the filter covers the entire spectacle lens 105. In further embodiments, the filter can cover only a portion of the lens 105, such as the top half of the lens 105, thereby permitting the wearer to view the electronic display through the filtered top half of the lens 105, while viewing the surroundings through the unfiltered lower half of the lens 105.

Figure 2:
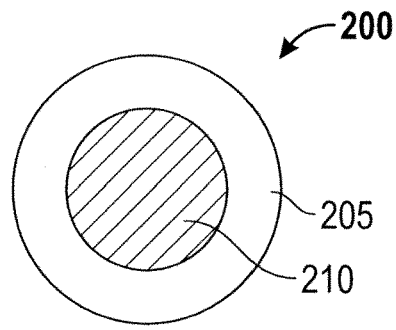
FIG. 2 is a front view illustrating contact lens ophthalmic eyewear 200 comprising a contact lens having a filter according to an embodiments of the invention.

FIG. 2 illustrates contact lens ophthalmic eyewear 200 comprising a contact lens 205 having a filter 210. The filter 210 can comprise a three band band-pass filter having a spectral characteristic that transmits the red, green and blue light as mixed and emitted by an electronic display, while blocking substantially all broadband light other than the same bandwidths. Other types of filters, such as those discussed hereinbelow, may be employed without departing from the scope of this embodiment. In the illustrated embodiment, the filter 210 covers only a portion the entire contact lens 205, specifically, the central portion of the lens 205, such that a peripheral portion of the lens 205 is unfiltered. In another embodiment, the filter 210 covers the entire lens 205. In further embodiments, the filter 210 can cover only a portion of the lens 205, such as the top half of the lens 205, thereby permitting the wearer to view the electronic display through the filtered top half of the lens 205, while viewing the surroundings through the unfiltered lower half of the lens 205.

Embodiments of the invention are directed toward at least one ophthalmic lens (e.g., spectacle lens 105 or contact lens 205) positioned between the wearer's eye and an electronic display. This lens features a spectral transmission intended to transmit the narrow bandwidths of the light generated by the display. In the case of a standard red-green-blue pixel display, the ophthalmic lens transmits the narrow band of each color while blocking substantially all of the remainder of the visible spectrum and the adjacent non-visible ultraviolet and infrared bandwidths. In some embodiments, the ophthalmic lens can be generally characterized as a three band band-pass filter.

In various embodiments, the ophthalmic lenses may be non-prescription or may be made according to a prescription containing spherical lenses and/or cylindrical lenses for the correction of nearsightedness or farsightedness. The lenses may be single vision or multifocal lenses and may be designed to correct higher order aberrations as measured with an aberrometer. The lenses may incorporate vertical and/or horizontal prism for the correction of binocular imbalances.

In one embodiment, the spectral transmission of the lens incorporates a filter to reduce the blue light hazard. In this embodiment, the percent transmission of the blue light bandwidth is reduced relative to the percent transmission of the red bandwidth and the green bandwidth.

Figure 3:
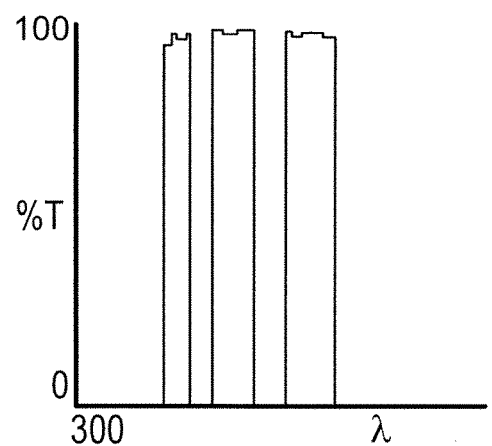
FIG. 3 is a graph representing a schematic of the transmission of a triple band band-pass filter representative of an embodiment of the invention.

FIG. 3 is a graph representing a schematic of the transmission of a triple band band-pass filter representative of an embodiment of the invention. A lens with this spectral transmission passes three narrow bands of light surrounding the 450 nm, 530 nm and 650 nm centers. In this example, the bandwidth of the blue band is approximately 35 nm, the green band is approximately 25 nm and the red band is approximately 60 nm. The transmission of each band is approximately 90%. A filter having this spectral characteristic transmits the red, green and blue light as mixed and emitted by the electronic display, while blocking substantially all broadband light other than the same bandwidths. Such a filter is known as a cut off filter. In other embodiments, a different filter can be employed that does not block all broadband light. For example, such a filter can permit not more than 20% transmission of broadband light, or not more than 50% transmission of broadband light.

Since the total width of the transmitted light is approximately 120 nm at an average transmission of about 90% and since the visible spectrum is estimated to range from 400 to 700 nm, the total transmission of the visible spectrum is slightly less than 20%. This transmission is equivalent to a standard sunglass lens and the appearance of general broadband polychromatic landscape is similar to a gray sunglass. However, when viewing narrow band light that falls within the three bands of the spectral transmission of the lens, these narrow bands are transmitted at 90% and appear to have significant relative brightness when compared to broadband light.

The high transmission rate of the narrow band light relative to broadband light allows a wearer to view an electronic display in high ambient illumination and when a high level of broadband light is reflected from the surface of a display. As a result, the display is seen in high contrast. Additionally, lower screen brightness and resultant power is required for good visibility of the display. Furthermore, the wearer's eyes are more relaxed during use, and the incorporation of individual refractive correction and correction for binocular vision imbalances can contribute to ocular ease and comfort while viewing electronic displays.

According to a further embodiment, the ophthalmic lens can have varying bandwidths for each of the three band-pass regions. Since the human eye is most sensitive to the green band of light, less transmission is required to produce a visual response. Accordingly, the green band can be more narrow or can have reduced transmission. In some such embodiments, the same band widths are maintained while the transmission is reduced for the green band relative to the red and blue bands. By way of example, the transmission for the green and red bandwidths can be held at 90% while the green bandwidth is reduced to 80%.

In yet another embodiment, the blue bandwidth is reduced for the purpose of reducing the blue light hazard. In this embodiment the transmission of the blue bandwidth is reduced to 70%, the green bandwidth is reduce to to 80% and the red bandwidth is maintained at 90%.

In some embodiments, the center of each band, the width and the percent transmission is customized for each display specification. While the red, green and blue pixels in conventional electronic displays are somewhat standard, it is anticipated that they may vary in future displays. Further, laser projector or LCOS generated displays using holographic films or transflective diffusers have bandwidths for each of the three colors that are less wide than the bandwidths of the colors in the pixels used in occluded LED and LCD displays. Embodiments of the invention are directed toward producing ophthalmic lenses which are customized for the particular display specifications of the individual user.

In some embodiments, an ophthalmic lens includes the individual lens prescription along with the filtering for the bandwidths of the electronic device used by the individual, while also providing protection from hazards of specific wavelengths.

In yet another embodiment, the spectral transmission is expanded in the blue bandwidth to allow the wavelength from 470 to 500 nm to serve as a zeitgeber for the purpose of stimulating the retinal-hypothalamic tract to prevent the release of melatonin, which in turn contributes to a feeling of fatigue consistent with the circadian rhythm response to dim light absent of this wavelength. This passive element uses the light source of the computer display in contrast to active illumination.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative embodiments may be implemented to achieve the desired features of the present invention. Also, a multitude of different constituent part names other than those depicted herein may be applied to the various parts of the devices. Additionally, with regard to operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for correcting light interference when viewing electronic displays, comprising:
    an electronic display that mixes and emits red light, green light, and blue light; and ophthalmic eyewear, comprising:
- a frame;
- a spectacle lens having a filter and being disposed within the frame;
- wherein the filter comprises varying bandwidths for each of three bands, whereby a center of each band, a width of each band and a percent transmission of each band is customized for transmitting the red light, the green light, and the blue light emitted by the electronic display, such that the customized transmission matches emissions of the electronic display;
- wherein the filter comprises a spectral characteristic that transmits the red light, transmits the green light, transmits the blue light as mixed and emitted by the electronic display, while transmitting some, but not more than 50% of visible broadband light other than the same bandwidths.

2. The ophthalmic eyewear of claim 1, wherein the lens comprises a soft lens, rigid lens, hybrid lens, intracorneal lens, corneal onlay, or intraocular lens.

* * * * *